Patented Mar. 16, 1948

2,437,799

UNITED STATES PATENT OFFICE 2,437,799

CRAZE-RESISTANT SYNTHETIC RESIN COATED PRODUCT AND PROCESS OF MAKING IT

Nelson Richard Yorke, Trenton, N. J., assignor to St. Regis Paper Company, New York, N. Y., a corporation of New York No Drawing. Application June 22, 1945, Serial No. 601,075

9 Claims. (Cl. 154—121)

This invention pertains to thermosetting laminating varnishes adapted to provide a surface film which is resistive against cracking or "crazing," to methods of producing the varnish, and to laminated products made therewith. The varnish as ordinarily prepared will incorporate a pigment, since pigmented surface films are most susceptible to surface cracking or crazing, but finds application both with and without the pigment.

Laminated plastic products which are subjected to marked variations in temperature and humidity conditions, and particularly such as embody pigmented surface coatings, such, for example, as the breaker strip employed in electric refrigerators and the like, are frequently found to develop a myriad of randomly distributed, fine surface cracks or fissures, collectively designated as "crazing".

Attempts have been made to overcome this effect by incorporating finely comminuted paper fibers or flock in the laminating varnish used for impregnating the surface layer of the laminate. The improvement effected along this line has been limited, due to the inherent weakness of the paper fibers against crazing stresses. Also, the paper fibers tend to impart a degree of opacity to the surface film, which renders color matching difficult and necessitates careful dyeing thereof to prevent off-color effects. Even so, the use of paper fibers makes color matching difficult. Also, paper fibers, being highly moisture-absorbent, tend to impart this property to the laminate surface with resulting surface dulling and weakening of the craze-inhibiting action.

I have discovered that the above-mentioned tendencies may be overcome and superior craze-inhibiting properties obtained in surface films obtained from a laminating varnish incorporating finely comminuted glass fibers, provided these fibers are sufficiently thin and of proper length and are present within rather critical proportions in relation to the resin and pigment contents as noted below.

With these precautions properly taken into account, many advantages result from the use of glass fibers in contradistinction to paper fibers in craze-inhibiting resinous films. Glass fibers do not absorb moisture or swell when exposed to high humidity; consequently, the gloss of the film is not dulled or impaired. Also, glass fibers are much stronger and harder than fibers of paper. For these reasons, the surface film of the laminate is rendered harder, more durable, permanent, glass-like, and more craze-resisting. Also, glass fibers, being substantially transparent, do not appreciably change or affect the panel color, whereby off-color effects are avoided and color matching and dyeing of the fibers is not required.

The glass fibers to be suitable must be extremely thin, preferably of the order of one micron, i. e., $1 \times 10^{-4}$ inch in diameter. The length of the individual fibers is not critical, so long as it greatly exceeds the diameter and provided it is not too great. A minimum length of the order of one hundred times the diameter or so is desirable. Commercially available sources of raw material which are acceptable, are those known as "Owens-Corning AA crushed glass fiber," or "Owens-Corning ⅛ inch textile glass fiber." These materials are exceptionally good substances for imparting the above-mentioned desirable properties to a surface film produced from a laminating varnish incorporating the same.

The preferred procedure for making a laminating varnish, in accordance with the invention, consists in dissolving a thermosetting resin in a suitable solvent and adding thereto glass fiber of the character aforesaid, and also a pigment, if desired. The entire mixture is thereupon ball-milled until the glass fiber and the pigment are uniformly distributed throughout the varnish.

The thermosetting resin thus employed may be of any type suitable for laminating, such as the thermosetting phenolic, melamine, urea, or alkyd resins, etc., preferably those made by reaction with formaldehyde.

Likewise, any suitable pigment may be used, such as zinc sulfide, titanium white, etc.

The ball-milling operation is carried out for about ten to twenty hours, usually about fifteen to sixteen hours.

As stated, the proportions for the glass-fiber content are quite critical for imparting craze-inhibiting qualities; and should be held within extreme limits of about 2 to 12% by weight, and preferably within 3 to 10% of the total solids content of the varnish, i. e., resin plus pigment plus glass fiber. An optimum range is about 6 to 8%. For a resin content of about 50 to 55% by weight of the total solids, the preferred glass-fiber content is about 3 to 9%, with pigment constituting the balance of about 36 to 47%.

The following is given as a specific illustration of the invention as applied to the production of a surface sheet for a laminated product having a craze-resisting, pigmented surface:

Example

A surface sheet comprising a pigmented, alpha cellulose paper is impregnated with a suitable melamine resin to the extent of 50% resin. A suitable resin for this purpose is that put out by the American Cyanamid Co., and sold as its "Melmac 402." This sheet is then coated on the top surface with a pigmented varnish applied by reverse roll coating or spraying, and having the following typical formulation:

| | Parts by weight |
|---|---|
| Thermosetting melamine — formaldehyde resin (Melmac 402) | 115 |
| Water | 144 |
| Isopropanol | 144 |
| Zinc sulfide pigment (Kreb's Grade P) | 85 |
| Glass fiber "Owens-Corning crushed AA fiber" | 13.3 |

The mixture is ball-milled for sixteen hours and applied to the sheet by suitable means to the extent of about 40% by weight based on the untreated paper weight. This surface sheet is then dried to a residual free volatile content of about 3% and laminated in the usual manner with a suitable core material.

The core material will comprise the usual fibrous sheets of base material, such as paper or cotton, asbestos or glass cloth or mat, etc., impregnated with a thermosetting synthetic resin varnish, such as a melamine, urea or phenolic etc. resin varnish. After oven-drying to volatilize and remove the solvents, the sheets are stacked up in the usual way and the surface sheet or sheets placed on the previously prepared stack of core material, the entire assembly being thereupon consolidated under heat and pressure, employing, for example, a temperature of 135° C. or so and a pressure of about one thousand pounds per square inch.

Sheets of base material coated or impregnated with the varnish of the present invention are not restricted for use as surface sheets of laminates as aforesaid, but may also be advantageously employed as the core material in laminates which are formed with sharp bends, embossments, etc., for example, tubular stock, deep-drawn laminates and the like, wherein the glass fibers serve to inhibit cracking at the curves or sharp bends, embossments, etc.

I claim:

1. The process for producing a laminated product, having a craze-resisting and pigmented surface, which comprises: applying to a foundation body a surface sheet coated with a thermosetting synthetic resin varnish containing pigment and about 2 to 12% of glass fibers by weight of the total solids in said varnish, and consolidating the assembly under heat and pressure to produce a body having a substantially infusible, insoluble and craze-resisting pigmented continuous film on its surface.

2. A sheet of fibrous material coated with a thermosetting synthetic resin varnish containing a pigment and about 2 to 12% by weight of glass fibers.

3. A sheet of fibrous material coated with a thermosetting synthetic resin varnish containing pigment and glass fibers, said pigment comprising about 36 to 47% by weight of the total solids in said varnish, and said glass fibers about 3 to 9% thereof.

4. A laminated product comprising superimposed layers of fibrous sheet material impregnated with and consolidated by a thermosetting synthetic resin, said product having at least one surface thereof coated with a thermosetting synthetic resin containing a pigment and about 2 to 12% of glass fibers by weight of the total solids content of said surface coating.

5. A laminated product comprising superimposed layers of fibrous sheet material impregnated with and consolidated by a thermosetting synthetic resin, said product having at least one surface thereof coated with a thermosetting synthetic resin containing in percentage by weight of the total solids content of said surface coating, about 50 to 55% resin, about 36 to 47% pigment, and about 3 to 9% glass fibers.

6. A laminated product comprising superimposed layers of fibrous sheet material impregnated with and consolidated by a themosetting synthetic resin, said product having at least one surface thereof coated with a thermosetting melamine resin containing a pigment and about 2 to 12% of glass fibers by weight of the total solids content of said surface coating.

7. A laminated product comprising superimposed layers of fibrous sheet material impregnated with and consolidated by a thermosetting synthetic resin, said product having at least one surface thereof coated with a thermosetting urea resin containing a pigment and about 2 to 12% of glass fibers by weight of the total solids content of said surface coating.

8. A sheet of fibrous material having a surface coated with a thermosetting melamine resin containing a pigment and about 2 to 12% by weight of glass fibers.

9. A sheet of fibrous material having a surface coated with a thermosetting urea resin containing a pigment and about 2 to 12% by weight of gas fibers.

NELSON RICHARD YORKE.

REFERENCES CITED

The following references are of record in the file of this patent:

UNITED STATES PATENTS

| Number | Name | Date |
|---|---|---|
| 1,997,358 | Cochrane | Apr. 9, 1935 |
| 2,176,837 | Ellis | Oct. 17, 1939 |

Certificate of Correction

Patent No. 2,437,799.                                                                 March 16, 1948.

NELSON RICHARD YORKE

It is hereby certified that errors appear in the printed specification of the above numbered patent requiring correction as follows: Column 2, line 12, for "hundered" read *hundred*; column 4, line 51, claim 9, for "gas" read *glass*; and that the said Letters Patent should be read with these corrections therein that the same may conform to the record of the case in the Patent Office.

Signed and sealed this 11th day of May, A. D. 1948.

[SEAL]

THOMAS F. MURPHY,
*Assistant Commissioner of Patents.*